Nov. 19, 1929.  H. E. HOUSEMAN  1,736,082
BRAKE FOR MOTOR DRIVEN VEHICLES
Filed Aug. 12, 1927  2 Sheets-Sheet 1
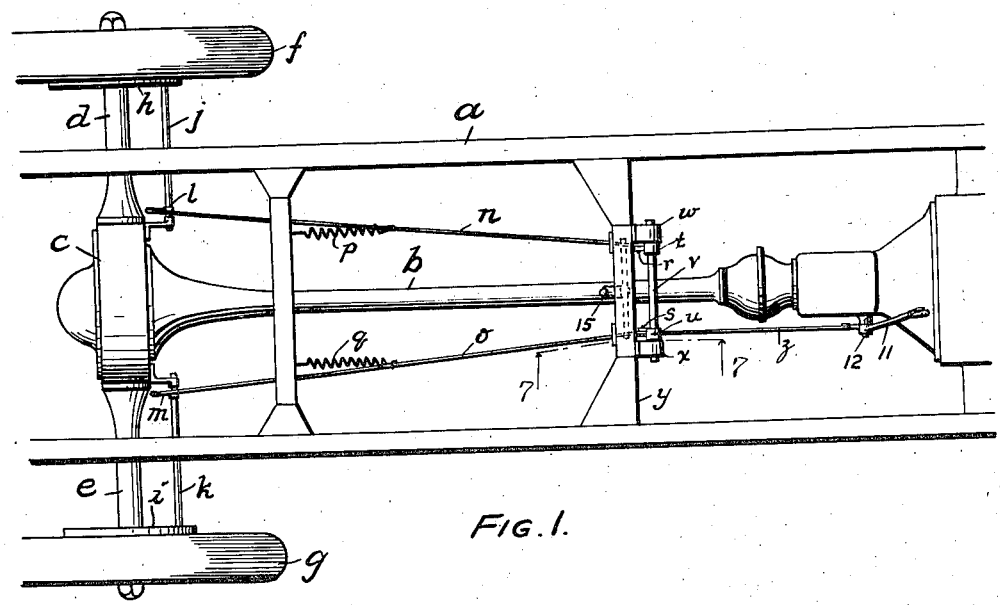
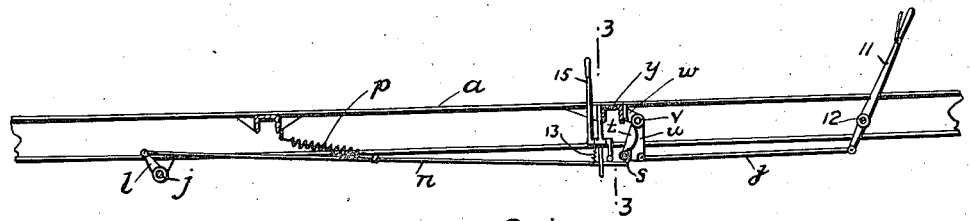
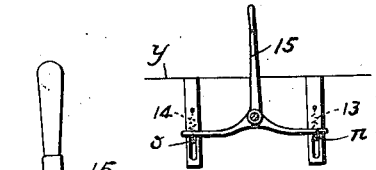
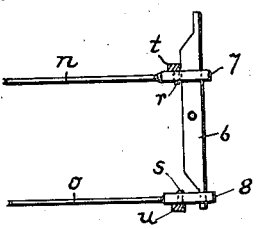
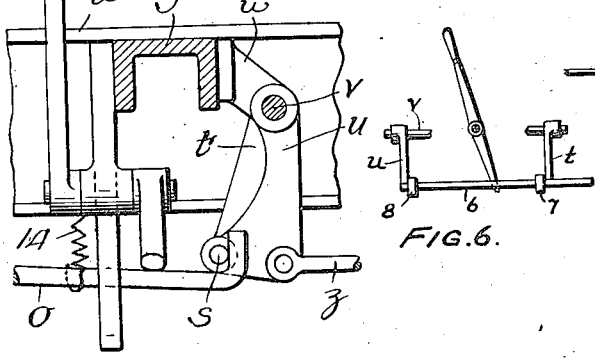
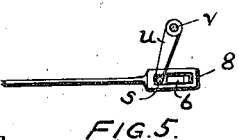
INVENTOR
*Harold E. Houseman*
BY
*Busser and Harding*
ATTORNEYS.

Nov. 19, 1929.                H. E. HOUSEMAN                1,736,082
                      BRAKE FOR MOTOR DRIVEN VEHICLES
                          Filed Aug. 12, 1927          2 Sheets-Sheet 2

INVENTOR

Harold E. Houseman
BY
Busser and Harding
ATTORNEYS.

WITNESS:

Patented Nov. 19, 1929

1,736,082

UNITED STATES PATENT OFFICE

HAROLD E. HOUSEMAN, OF EDGE MOOR, DELAWARE

BRAKE FOR MOTOR-DRIVEN VEHICLES

Application filed August 12, 1927. Serial No. 212,393.

As is well known in the art, most automobiles are equipped with differential gearing through which the power is transmitted from the drive shaft to the two rear wheels. The purpose of these gears is well known, but as either wheel may be driven independently of the other, it is impossible, in a car equipped with the one brake mechanism, to propel the car forward when one or the other of the rear wheels fails to grip the road. In other words, should one of the rear wheels become mired, or rest in deep snow or loose sand, the other rear wheel, even though it may rest on solid ground, fails to move the car, due to the fact that all of the power is being transmtted to the free wheel, which is revolving without securing the traction necessary to move the car.

The object of this invention is to remedy this defect. The invention comprises means for so adjusting the rear wheel brakes that the one on the free wheel alone will be operative. The application of the braking force to this wheel alone will, as soon as the resistance to the revolution of this wheel becomes great enough, cause the other wheel to become operative to move the car forward so that the first named wheel will be brought out of that part of the road where it failed to have traction. While such means are not broadly new, the means herein disclosed are of special advantage and are applicable to well known makes of automobiles and are so designed that the operator can, without leaving the driver's seat, by the movement of a simple lever, render either one or the other of the brakes that are on the rear wheels inoperative for the purpose described.

It is obvious that no specific construction can be devised that would apply to the different varieties of brakes that are now in use on different makes of automobiles. Brakes may be constructed to operate mechanically, hydraulically or electrically, and they may be applied to the rear wheels only or to all four wheels; and in each case the brakes per se and their operative means may be constructed in various ways. It is, therefore, necessary for the skilled mechanic to adapt the invention to any of the known brake mechanisms. This he can readily do after understanding the embodiments of the invention hereinafter disclosed, which embodiments must be taken as merely illustrative of several of many possible modifications of my invention which may be devised to render the braking mechanism operative only on the wheel which has lost traction.

Fig. 1 is a plan view showing one embodiment of my invention adapted to the brake mechanism of an automobile of a well known make.

Fig. 2 is a side view of the same mechanism.

Fig. 3 is a section on the line 3—3 of Fig. 2.

Fig. 4 is a plan view of a modified device.

Fig. 5 is a side view of the device of Fig. 4.

Fig. 6 is an end view of the device of Figs. 4 and 5.

Figure 7:
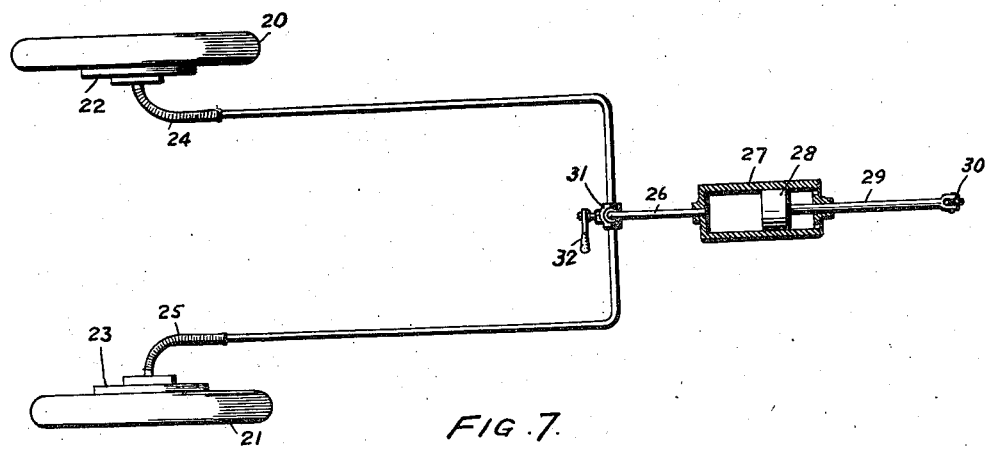
Fig. 7 is an enlarged view of the central part of Fig. 2, the same being a section on the line 7—7 of Fig. 1.
Figure 8:
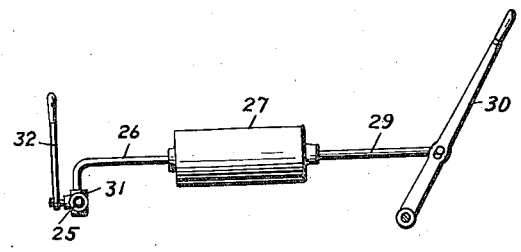
Figure 9:
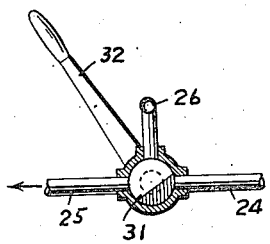

Referring to Figs. 1, 2, 3 and 7: $a$ represents the frame, $b$ the tube through which the drive shaft passes, $c$ the casing which encloses the differential driving gears, and $d$ and $e$ the tubular casings through which the driving axles pass to the rear wheels $f$ and $g$. On wheels $f$ and $g$ are the customary brakes $h$ and $i$ (whose construction, being well known, requires no illustration). The brakes are operated by the turning of shafts $j$ and $k$. These shafts have arms $l$ and $m$ projecting upward to which are attached the pull rods $n$ and $o$. Springs $p$ and $q$ serve to return rods $n$ and $o$ to release the brakes. These rods $n$ and $o$ are each bent upward, at their forward ends, in front of projecting studs $r$ and $s$ on arms $t$ and $u$, respectively. These arms extend downward from a shaft $v$, which turns in bearings $w$ and $x$ attached to the cross frame $y$. The shaft $v$ is turned by the pull rod $z$ which connects arm $u$ with the lower end of the hand brake lever 11 pivoted between its ends at 12.

It will be readily seen that the pulling back of hand brake lever 11 rocks shaft $v$, which, in turn, by the engagement of studs $r$ and $s$ of arms $t$ and $u$ with the hooked ends of brake rods $n$ and $o$, causes the brake rods to rock the shafts $j$ and $k$ and thereby apply the brakes $h$ and $i$ to the two rear wheels $f$ and $g$. When the hand brake lever is released, all the rods and shafts are moved in the opposite direction by the pull of springs $p$ and $q$ on rods $n$ and $o$, thereby releasing the brakes.

Except for the loose connection between the arms $t$ and $u$ and the brake rods $n$ and $o$, the construction is substantially that of a well known type of braking mechanism, and this loose connection does not prevent the brakes from normally operating in the regular way. By providing the described loose connection and by combining it with the special mechanism about to be described, either brake may be rendered inoperative without affecting the operativeness of the other. To secure this object, it is only necessary to swing down the forward end of rod $n$ or rod $o$ against the action of its respective spring 13 or 14, which normally holds such rod up into operative relation with its respective actuating stud $r$ or $s$. By swinging down the end of rod $n$ or $o$, the hooked end of the rod escapes engagement with the corresponding stud when the hand lever 11 is pulled back, but the other stud operates the other brake rod and the corresponding brake.

The preferred means which I employ to selectively render inoperative either of the brake rods $n$ and $o$ consists of a three-armed lever 15 pivoted to the cross frame $y$. The two sidewise extending arms of this lever extend just above the rods $n$ and $o$. The upward extending arm of this lever extends through a space in the floor of the automobile to a point where it is within easy reach of the operator. When this latter arm is in a central or vertical position, the two side arms are so positioned as not to prevent the normal operation of the rods $n$ and $o$ by the brake lever 11, which will therefore apply both brakes to the rear wheels. If the operator swings lever 15 to one side of its center (to the right, Fig. 3), it depresses brake rod $n$ so that its hooked end will escape engagement with its actuating stud $r$ when the brake lever 11 is pulled. As a result, only one brake $i$ will be applied. By swinging lever 15 in the opposite direction, the operator effects a disengagement of the hooked end of lever $o$ with the stud $s$, and when brake 11 is pulled, only the brake $h$ will operate.

Let it be assumed, for illustration, that wheel $f$ is mired and that wheel $g$ has a good grip on the road and that any attempt to apply power to the wheels merely results in the spinning of wheel $f$. Instead of relying on outside assistance to drag the car forward until both wheels secure a good grip on the road, the operator merely swings lever 15 into position to render brake $i$ on wheel $g$ inoperative, after which brake lever 11 is pulled back until the resistance to the turning of wheel $f$ becomes greater than the driving resistance between wheel $g$ and the road bed, with the result that the car will be moved forward by wheel $g$ and wheel $f$ will slide onto the solid road bed. If desired, the brake lever 11 may be slowly pulled back while the driving power is spinning the mired wheel until the resistance to revolution of the two wheels is equalized, with the result that the mired wheel will then turn slowly as the other wheel takes hold and will thereby help to drag itself out of the mire.

I have shown in Figs. 4, 5 and 6 another means for disconnecting either brake. A sliding piece 6, reduced at each end, extends into slots in pieces 7 and 8, which are screwed to the ends of rods $n$ and $o$. Studs $r$ and $s$ also operate in the slots of the respective pieces 7 and 8. If the sliding piece 6 is pushed to the right, as shown in Fig. 6, the slot in piece 7 will be completely filled by the wide portion of piece 6 and stud $t$, and rod $n$ will be pulled when brake rod 11 is operated, thereby applying the brake $h$ to wheel $f$. Rod $o$, however, will not be pulled to operate its brake, because only the narrow portion of lever 6 extends into its slotted end, and stud $s$, when brake lever 11 is pulled, will merely swing through the unoccupied portion of the slot in piece 8. If, however, the sliding piece 6 is pushed to the left, the wide portion will fill the slot in piece 8 which is on the end of rod $o$ and the narrow portion will fail to fill the slot in piece 7 on the end of rod $n$, and when brake lever 11 is pulled, only the brake $i$ on wheel $g$ will operate. If, on the other hand, the sliding piece 6 is placed in a central position, the wide portion will then be in the slots of both pieces 7 and 8 and the operation of the brake lever 11 will apply both brakes.

Having now fully described my invention, what I claim and desire to protect by Letters Patent is:—

In a motor driven vehicle, in combination, two drive wheels, brakes thereon, rods connected with and adapted to operate the respective brakes, a shaft and two arms turnable therewith, a brake lever and connections therefrom adapted to swing said shaft and arms, and a brake selecting lever, said arms being maintained in operative relation with their respective brake rods when said brake selecting lever is centrally positioned, said brake selecting lever being movable to either side of its central position to effect a disconnection between either arm and its corresponding brake rod and thereby permit such arm to swing without moving its corresponding brake rod.

In testimony of which invention, I have hereunto set my hand, at Philadelphia, Pennsylvania, on this 10th day of August, 1927.

HAROLD E. HOUSEMAN.